(12) United States Patent
Rinaldi et al.

(10) Patent No.: US 7,981,176 B2
(45) Date of Patent: Jul. 19, 2011

(54) PARTICULATE FILTER AND METHOD FOR ITS ASSEMBLY

(75) Inventors: Fabrizio C. Rinaldi, Jackson, MI (US); Keith G. Olivier, Jackson, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 258 days.

(21) Appl. No.: 12/269,931

(22) Filed: Nov. 13, 2008

(65) Prior Publication Data

US 2009/0126325 A1 May 21, 2009

Related U.S. Application Data

(60) Provisional application No. 60/988,174, filed on Nov. 15, 2007.

(51) Int. Cl.
*B01D 39/08* (2006.01)

(52) U.S. Cl. ............... 55/322; 55/525; 55/413; 55/418; 55/DIG. 30

(58) Field of Classification Search .......... 210/457, 210/483, 487, 488, 489, 493.1, 493.2, 497.01, 210/497.1; 55/224, 320, 321, 323, 324, 330, 55/413, 418, 482, 486, 487, 490, 492, 498, 55/510, 521, 525, DIG. 30, DIG. 5; 164/98
See application file for complete search history.

(56) References Cited

U.S. PATENT DOCUMENTS

| | | | |
|---|---|---|---|
| 2,975,586 A | 3/1961 | Bray | |
| 3,007,579 A * | 11/1961 | Pall | 210/489 |
| 3,105,752 A | 10/1963 | Bruce | |
| 3,263,812 A * | 8/1966 | Hartley | 210/209 |
| 3,857,688 A * | 12/1974 | Wisnewski | 55/483 |
| 4,008,344 A | 2/1977 | Okamoto et al. | |
| 4,051,287 A | 9/1977 | Hayashi et al. | |
| 4,149,862 A | 4/1979 | Sewell, Sr. | |
| 4,567,725 A | 2/1986 | Shinzawa et al. | |
| 4,865,635 A * | 9/1989 | Cuevas | 55/485 |
| 5,173,186 A * | 12/1992 | Spafford et al. | 210/455 |
| 5,203,355 A | 4/1993 | Clearman et al. | |
| 5,212,948 A * | 5/1993 | Gillingham et al. | 60/288 |
| 5,238,474 A | 8/1993 | Kahlbaugh et al. | |
| 5,250,094 A * | 10/1993 | Chung et al. | 55/523 |
| 5,303,720 A | 4/1994 | Banerjee et al. | |
| 5,593,181 A * | 1/1997 | Walker et al. | 280/741 |
| 5,682,740 A | 11/1997 | Kawamura | |
| 5,702,494 A * | 12/1997 | Tompkins et al. | 55/498 |
| 5,755,962 A * | 5/1998 | Gershenson et al. | 210/452 |
| 5,817,234 A * | 10/1998 | Dye et al. | 210/232 |
| 5,992,518 A * | 11/1999 | Whitlock | 166/235 |
| 6,196,581 B1 * | 3/2001 | Katsuda et al. | 280/736 |
| 6,382,318 B1 * | 5/2002 | Whitlock | 166/278 |
| 6,387,143 B1 * | 5/2002 | Adiletta | 55/497 |
| 6,568,539 B1 * | 5/2003 | Deibel et al. | 210/443 |
| 6,857,525 B2 * | 2/2005 | Parent | 210/457 |
| 6,942,708 B2 | 9/2005 | Peter et al. | |
| 7,294,162 B2 * | 11/2007 | Anderson et al. | 55/498 |

(Continued)

*Primary Examiner* — Duane Smith
*Assistant Examiner* — Thomas McKenzie
(74) *Attorney, Agent, or Firm* — Harness, Dickey & Pierce, P.L.C.

(57) ABSTRACT

A particulate filter cartridge has a woven metal fiber filter medium surrounding a perforated support tube. The filter medium is crimped down to the support tube at opposite ends thereof and then welded to the support tube at the crimped regions. A plurality of such cartridges can then be nested within each other and separated by appropriate exhaust gas flow directing baffles to form a particulate filter assembly.

10 Claims, 10 Drawing Sheets

U.S. PATENT DOCUMENTS

| | | |
|---|---|---|
| 7,578,344 B2 * | 8/2009 | Hopkins et al. ............... 166/230 |
| 7,819,945 B2 * | 10/2010 | Morton et al. .................... 95/78 |
| 2003/0110949 A1 * | 6/2003 | Fornof et al. .................... 96/136 |
| 2004/0131511 A1 * | 7/2004 | Marrecau et al. ............. 422/174 |
| 2004/0148916 A1 | 8/2004 | Merkel |
| 2004/0216451 A1 | 11/2004 | LaBarge et al. |
| 2004/0226443 A1 | 11/2004 | Gillingham et al. |
| 2006/0137883 A1 * | 6/2006 | Kluger et al. .................. 166/380 |
| 2006/0151363 A1 * | 7/2006 | Ratiu .............................. 210/90 |

* cited by examiner

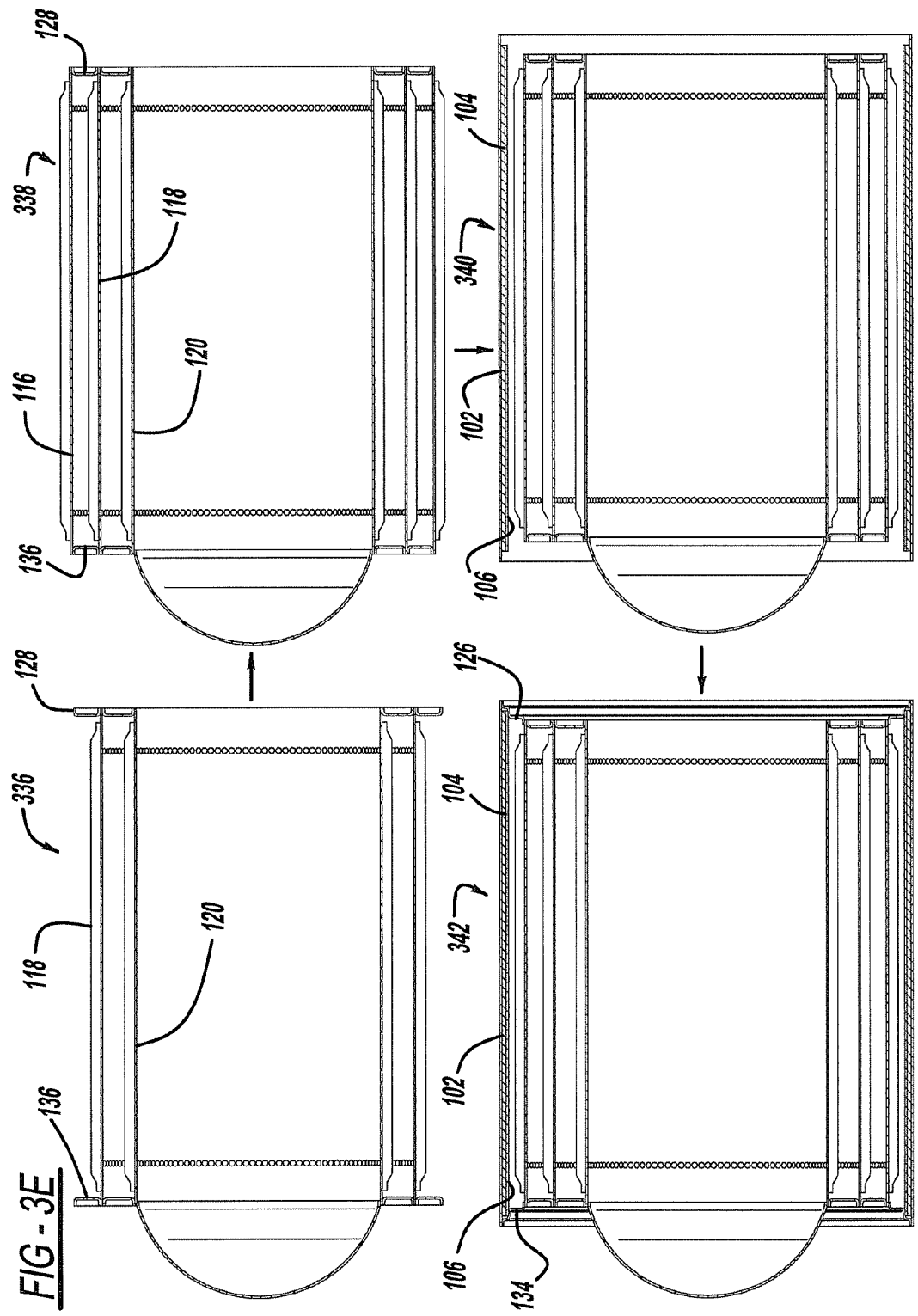

PARTICULATE FILTER AND METHOD FOR ITS ASSEMBLY

CROSS-REFERENCE TO RELATED APPLICATIONS

This application claims the benefit of U.S. Provisional Application No. 60/988,174, filed on Nov. 15, 2007. The entire disclosure of the above application is incorporated herein by reference.

FIELD

The present disclosure relates to a particulate filter assembly and a method for its construction.

BACKGROUND

This section provides background information related to the present disclosure which is not necessarily prior art.

Use of woven metal fiber filter media in particulate filters, such as Diesel particulate filters for automotive exhaust systems, has been hampered by difficulties in handling such fragile filter media while assembling the filter, often leading to poor mechanical durability of the device.

SUMMARY

This section provides a general summary of the disclosure, and is not a comprehensive disclosure of its full scope or all of its features.

In a first aspect of the present teachings, a particulate filter cartridge assembly includes a perforated support tube and a woven metal fiber filter medium surrounding the support tube and having inlet and outlet ends crimped down to the support tube, the filter medium welded to the support tube at crimped portions.

In another aspect of the present teachings, a method of assembling a particulate filter cartridge includes placing a woven metal fiber filter medium around a perforated support tube, crimping down the filter medium to inlet and outlet ends of the support tube, and welding crimped inlet and outlet portions of the filter medium to the support tube.

In yet another aspect of the present teachings, a particulate filter assembly includes a first perforated support tube having an inlet end and an outlet end, a first woven metal fiber medium surrounding the first support tube, crimped down to the first support tube at its inlet and outlet ends and welded to the first support tube at crimped ends of the first filter medium. A second perforated support tube having an inlet end and an outlet end surrounds the first woven metal fiber medium. A second woven metal fiber filter medium surrounds the second tube, is crimped down to the second support tube at its inlet and outlet ends and is welded to the second support tube at crimped ends of the second filter medium. A solid inlet center cap is coupled to the inlet end of the first support tube. A first perforated inlet baffle radially extends from an inlet end of the first support tube to an inlet end of the second support tube. A first solid outlet baffle radially extends from an outlet end of the first support tube to an outlet end of the second support tube. An outer housing shell surrounds the second woven metal fiber medium, and a second solid input baffle radially extends from an input end of the second support tube to an inlet end of the outer housing shell, while a second perforated outlet baffle radially extends from an outlet end of the second support tube to an outlet end of the outer housing shell.

In still another aspect of the present teachings, a method of assembling a particulate filter comprises placing a first woven metal fiber filter medium around a first perforated support tube and placing a second woven metal fiber filter medium around a second perforated support tube having a diameter larger than a diameter of the first support tube. The first filter medium is crimped down to inlet and outlet ends of the first support tube and the second filter medium is crimped down to inlet and outlet ends of the second support tube. The crimped inlet and outlet portions of the first filter medium are welded to the first support tube and the inlet and outlet crimped portions of the second filter medium are welded to the second support tube. A solid inlet center cap is welded to the inlet end of the first support tube, a first perforated inlet baffle is welded to the inlet end of the first support tube and a first solid output baffle is welded to the outlet end of the first support tube. The first support tube and filter medium is then inserted inside the second support tube. The inlet end of the second support tube is welded to the first perforated inlet baffle and the outlet end of the second support tube is welded to the first solid output baffle. The second filter medium is surrounded with an outer housing shell. A second solid input baffle is welded to the inlet end of the second support tube and to an inlet end of the outer housing shell. Finally, a second perforated output baffle is welded to the outlet end of the second support tube and to an outlet end of the outer housing shell.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The objects and features of the present teachings will become apparent upon a reading of a detailed description, taken in conjunction with the drawing, in which:

FIG. 3E is a flow chart showing a second portion of the particulate filter assembly process of the present teachings;

Corresponding reference numerals indicate corresponding parts throughout the several views of the drawings.

DETAILED DESCRIPTION

Figure 1:
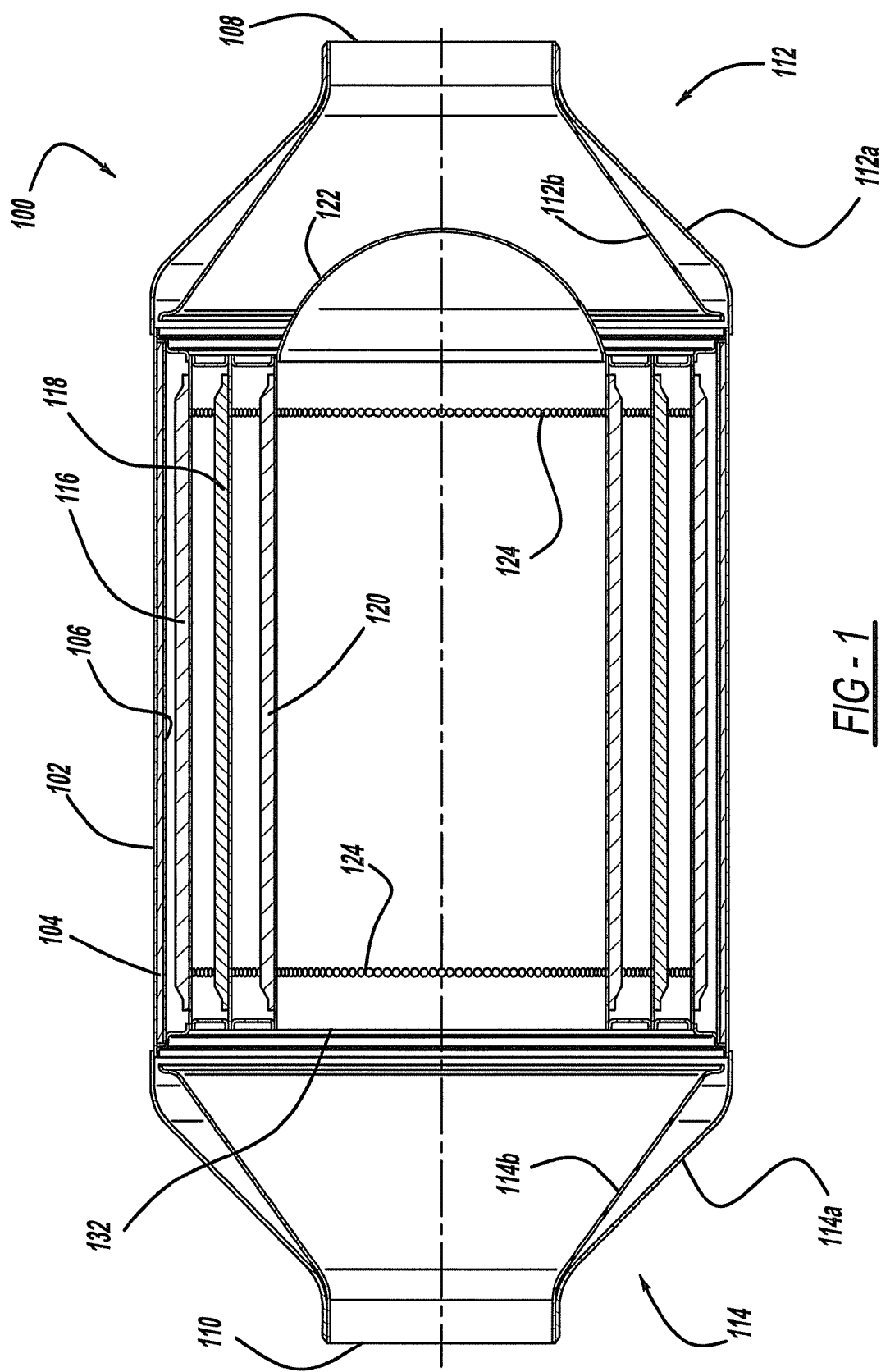
FIG. 1 is a side cross-sectional view of a particulate filter arranged in accordance with the present teachings.
Figure 1A:
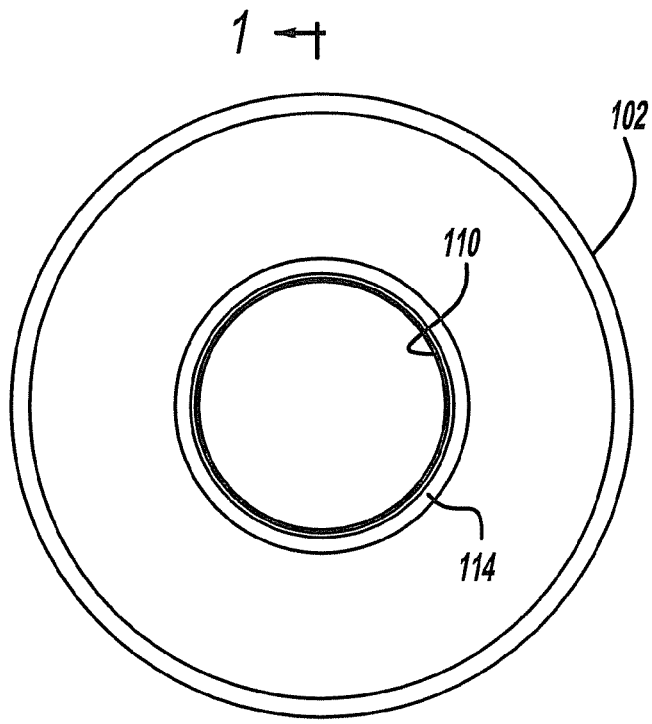
FIG. 1A is an end view of the particulate filter of FIG. 1.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1, 1A, 1B and 1C a multiple filter cartridge particulate filter assembly arranged in accordance with the present teachings is shown. Filter assembly 100 is, in this example, a tri-flow particulate filter using pleated woven metal fiber as the filter medium. Assembly 100 includes an outer shell 102, a layer of insulation 104 and an insulation retainer ring 106.

Filter inlet 108 is defined by an inlet cone assembly 112 comprised of an outer piece 112a and an inner piece 112b.

The filter outlet 110 is defined by an outlet cone assembly 114 which includes an outlet cone outer piece 114a and an outlet cone inner piece 114b.

Assembly 100 includes three concentrically nested filter cartridges. An outer filter element 116 has its filter medium supported by an inner core 116a comprised of a perforated cylindrical tube. Middle filter element 118 is surrounded by outer filter element 116 and has its filter medium supported by a cylindrical perforated tube 118a. Similarly, inner filter element 120 is surrounded by middle element 118 and has its filter medium supported on a cylindrical perforated inner tube 120a.

Attached, preferably by welding, to an inlet end of inner perforated support tube 120a is a solid inlet center cap 122.

Perforations in each of the three support tubes are shown at 124 only at the inlet and outlet ends of the tubes for clarity. It is to be understood that all support tubes in the disclosed apparatus are perforated over virtually all their surface area carrying a filter media.

Figure 1B:
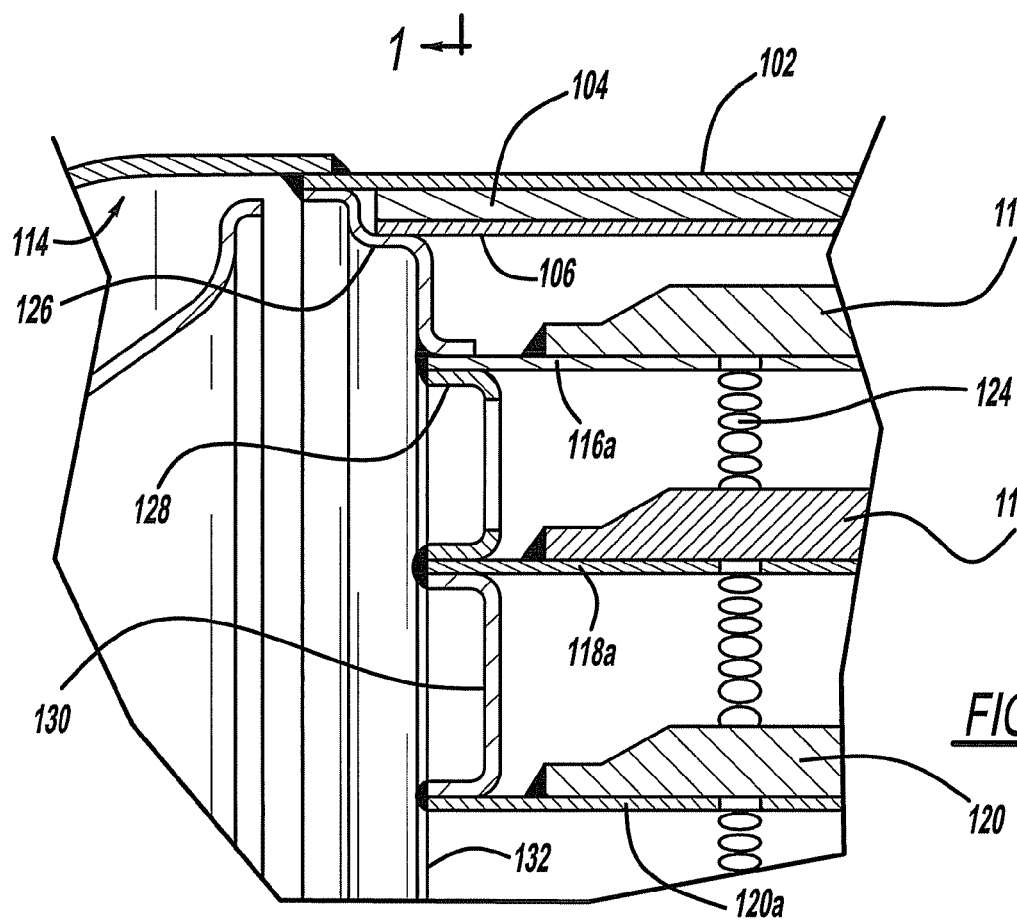
FIG. 1B is an enlarged view of an outlet section of the particulate filter of FIG. 1.

With more particular reference to FIG. 1B, outlet outer baffle 126 is welded to an outlet end of outer shell 102 and radially extends inwardly to be welded to support tube 116a for the outer filter element 116.

Outlet perforated middle baffle 128 radially extends between outer support tube 116a and middle support tube 118a and is welded to both the support tubes 116a and 118a. Inner solid output baffle 130 extends radially between inner support tube 120a and middle support tube 118a and is welded to both of those tubes 120a and 118a. The outlet end 132 of inner support tube 120a is left open for exit of the exhaust stream through the outlet cone assembly 114.

Figure 1C:
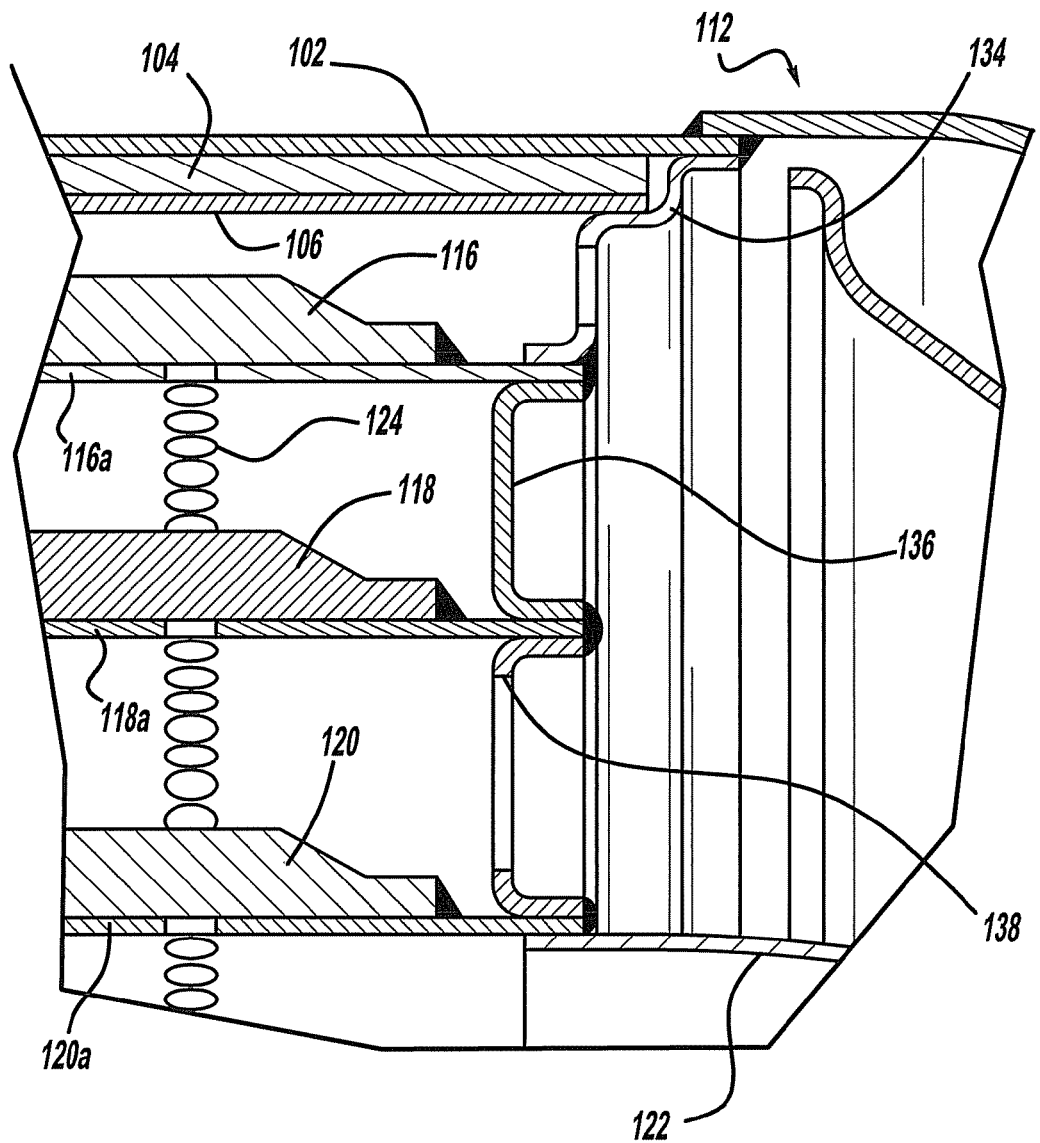
FIG. 1C is an enlarged view of an inlet section of the particulate filter of FIG. 1.

The baffles at the input end of the particulate filter 100 are shown in FIG. 1C. Inlet outer perforated baffle 134 radially extends between outer shell 102 and the outer support tube 116a and is welded to both 102 and 116a. Middle solid inlet baffle 136 extends between outer and middle support tubes 116a, 118a, respectively, and is welded thereto. Perforated inner inlet baffle 138 extends between middle support tube 118a and inner support tube 120a and is welded to both those tubes 118a and 120a.

Figure 2:
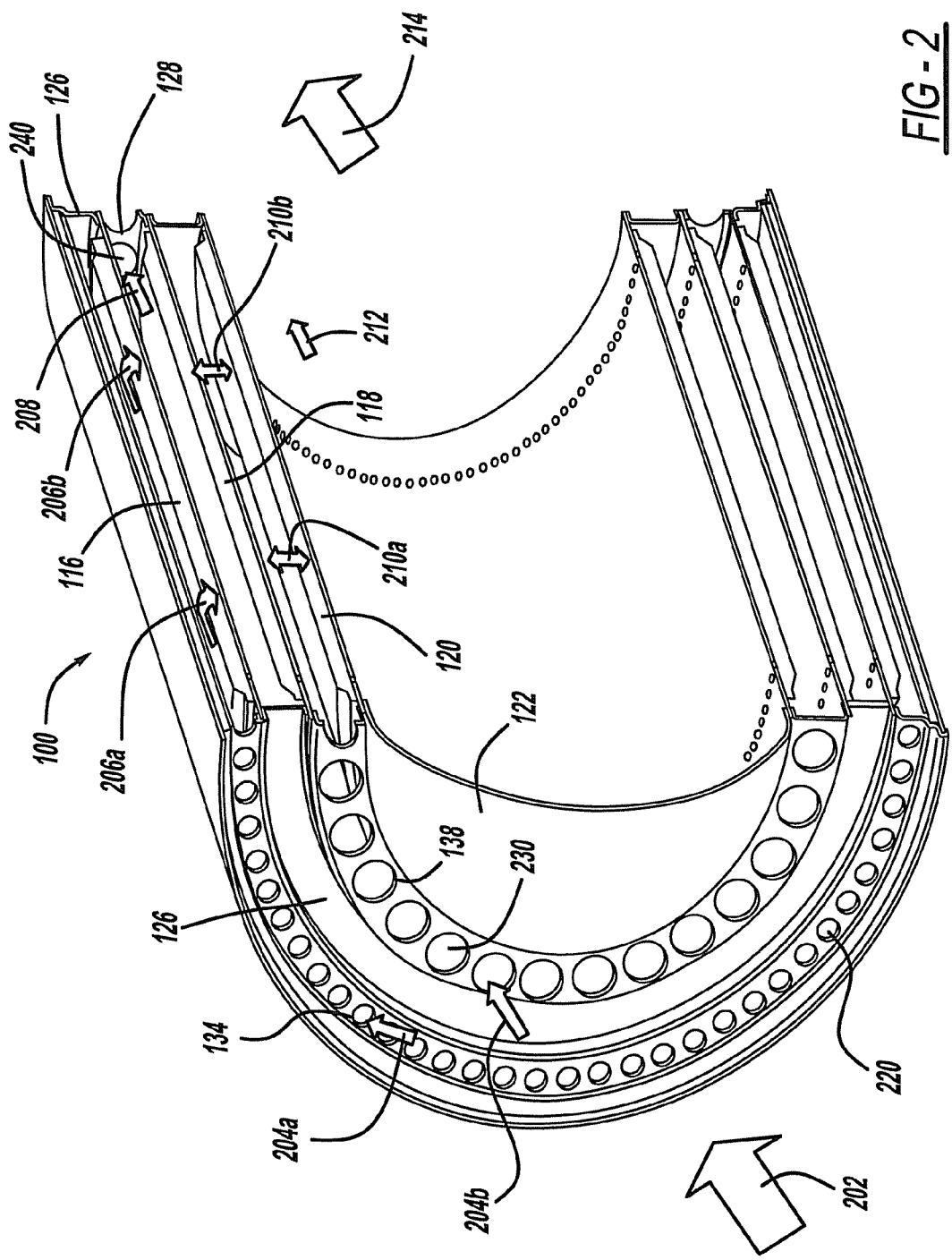
FIG. 2 is a perspective sectional view of the particulate filter of FIG. 1 showing exhaust flow through the device.

With reference to FIG. 2, exemplary flow paths of exhaust gas through the filter assembly 100 is set forth. The incoming exhaust stream represented by arrow 202 flows through the input cone 112 and is blocked from entering the inner support tube 120a by solid inlet center cap 122. The exhaust flow then splits at arrows 204a and 204b to respectively enter perforations in inlet outer baffle 134 and inlet inner baffle 138. The proportion of gas flow entering each of the inner and outer baffles is dictated by the size and number of the perforate openings in those baffles. As indicated by arrows 206a and 206b, exhaust gas entering the outer baffle 134 can then flow through outer filter medium 116 and perforated support tube 116a into the space between the outer filter cartridge and the middle filter cartridge. At this point, the exhaust can either exit the particulate filter via perforations 240 in outlet middle perforated baffle 128 or the exhaust gas can be directed radially inward as shown by arrows 210a and 210b through the middle filter cartridge and then through the inner filter cartridge to exit at arrow 212 from the inner support tube. The exhaust gas having been filtered forms a single output stream as shown by arrow 214 within output cone assembly 114. With the baffle arrangement shown, the exhaust flow can be distributed such that portions of the exhaust encounter each of the three filter elements.

Figure 3A:
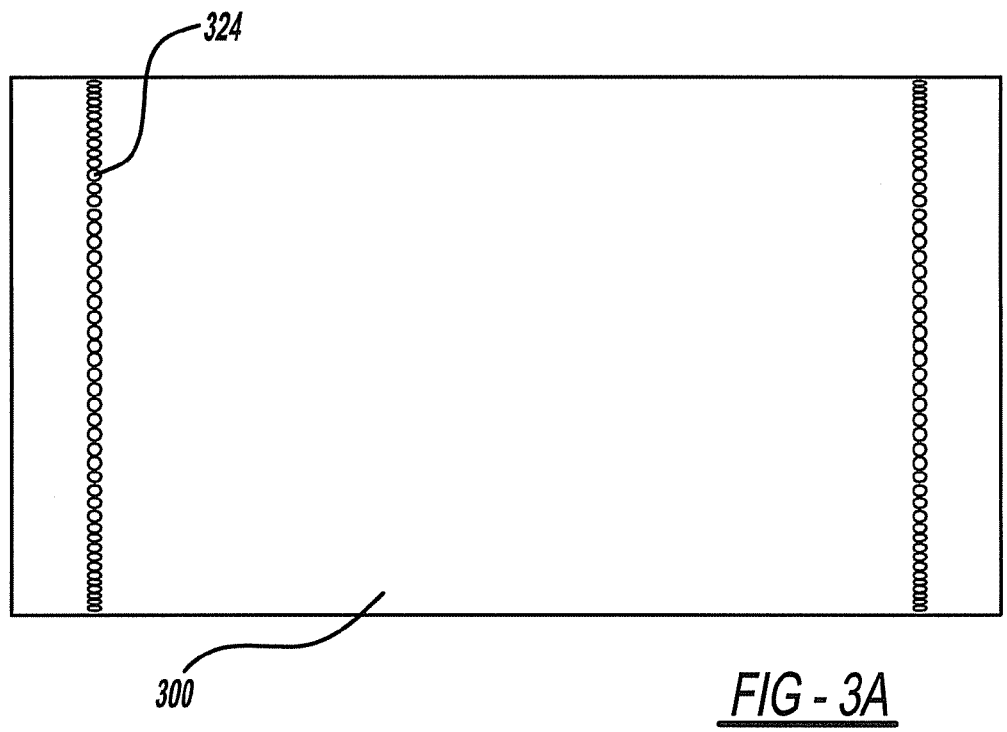
FIG. 3A is a side plan view of a perforated support tube arranged in accordance with the presenting teachings.
Figure 3B:
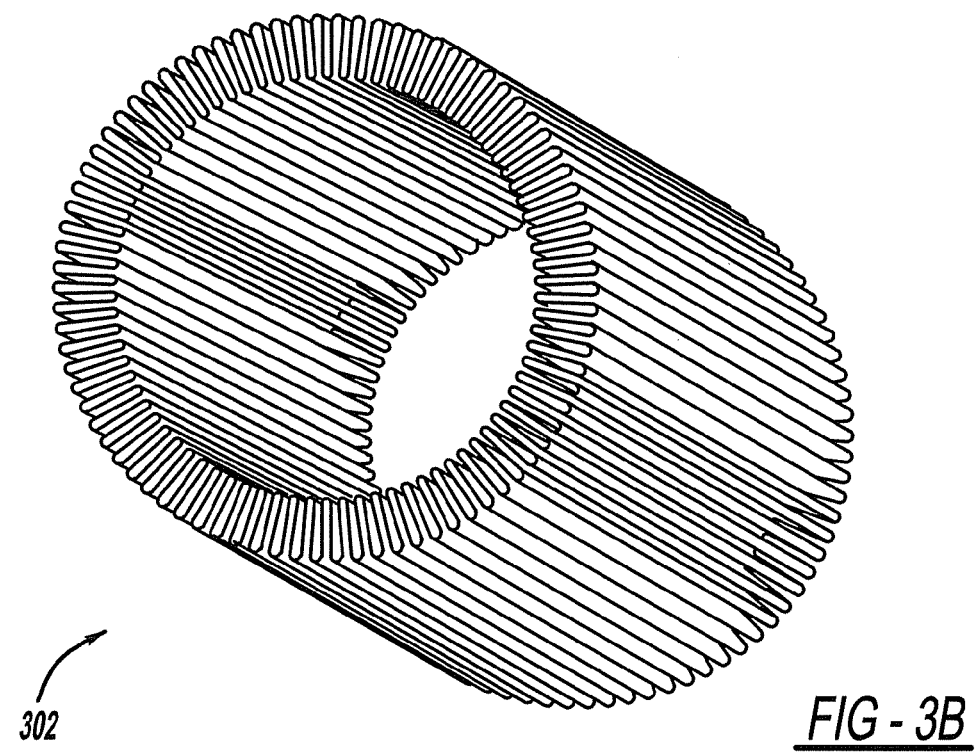
FIG. 3B is a perspective view of pleated woven metal fiber filter medium used in the particulate filter of the present teachings.
Figure 3C:
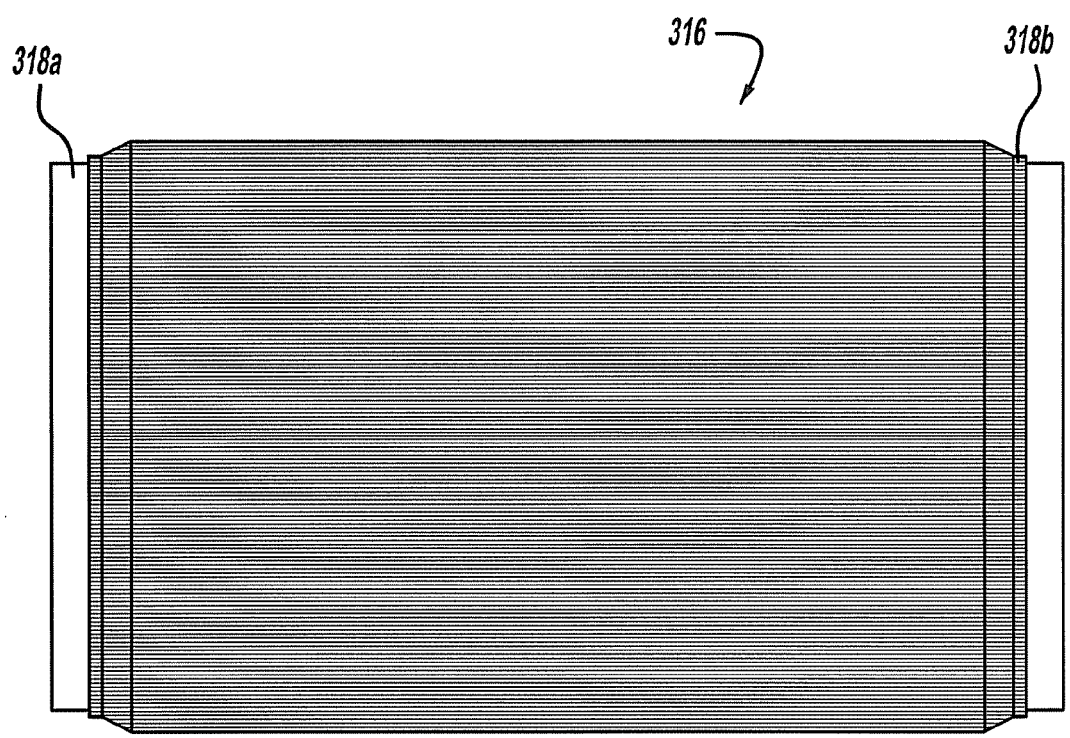
FIG. 3C is a side plan view of a filter cartridge arranged in accordance with the present teachings.

With reference to FIGS. 3A, 3B and 3C, the steps for assembling each filter cartridge of the particulate filter assembly, such as shown in FIG. 1, can be described.

Each perforated filter material support tube 300 is made from a perforated blank which is then rolled and seam welded to form a substantially cylindrical support tube. Perforations 324 extend over the entire surface of each support tube.

The pleated cylindrical filter material 302 is preferably comprised of woven metal fibers. To form filter medium 302 for each of the cartridges of the filter of FIG. 1, a sheet of the filter media is first pleated and then wrapped around a mandrel for welding at the ends of the pleat pack seam. The welded pleated filter medium pack is then slipped over its corresponding perforated tube 300 and, as shown in FIG. 3C, forms an assembled filter cartridge 316 having pleated filter medium 302 surrounding a perforated support tube 300, the filter medium being crimped down to the support tube at end regions 318a and 318b prior to welding of the crimped regions to the inner support tube.

Figure 3D:
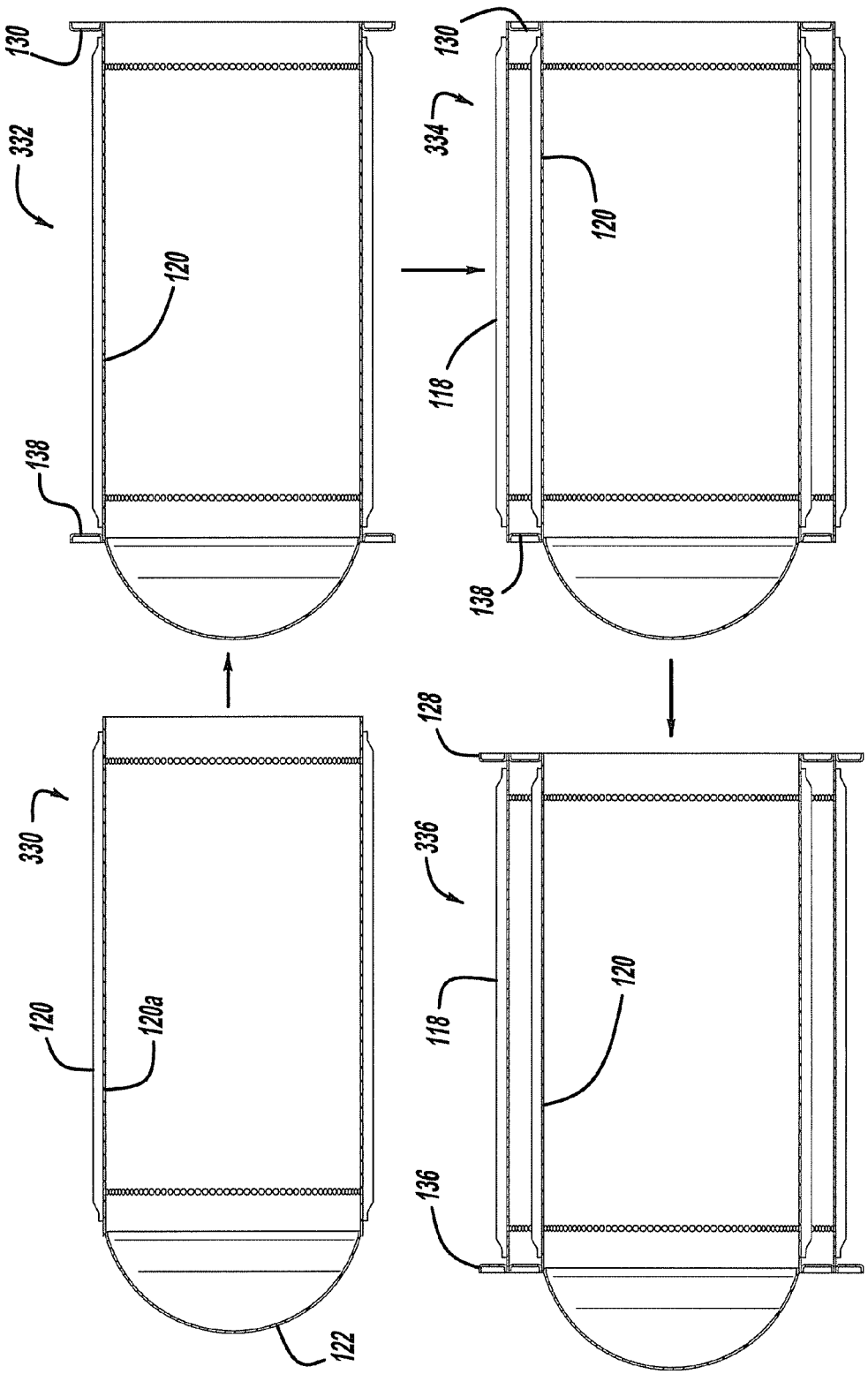
FIG. 3D is a flow chart showing a first portion of a particulate filter assembly process of the present teachings.
Figure 3F:
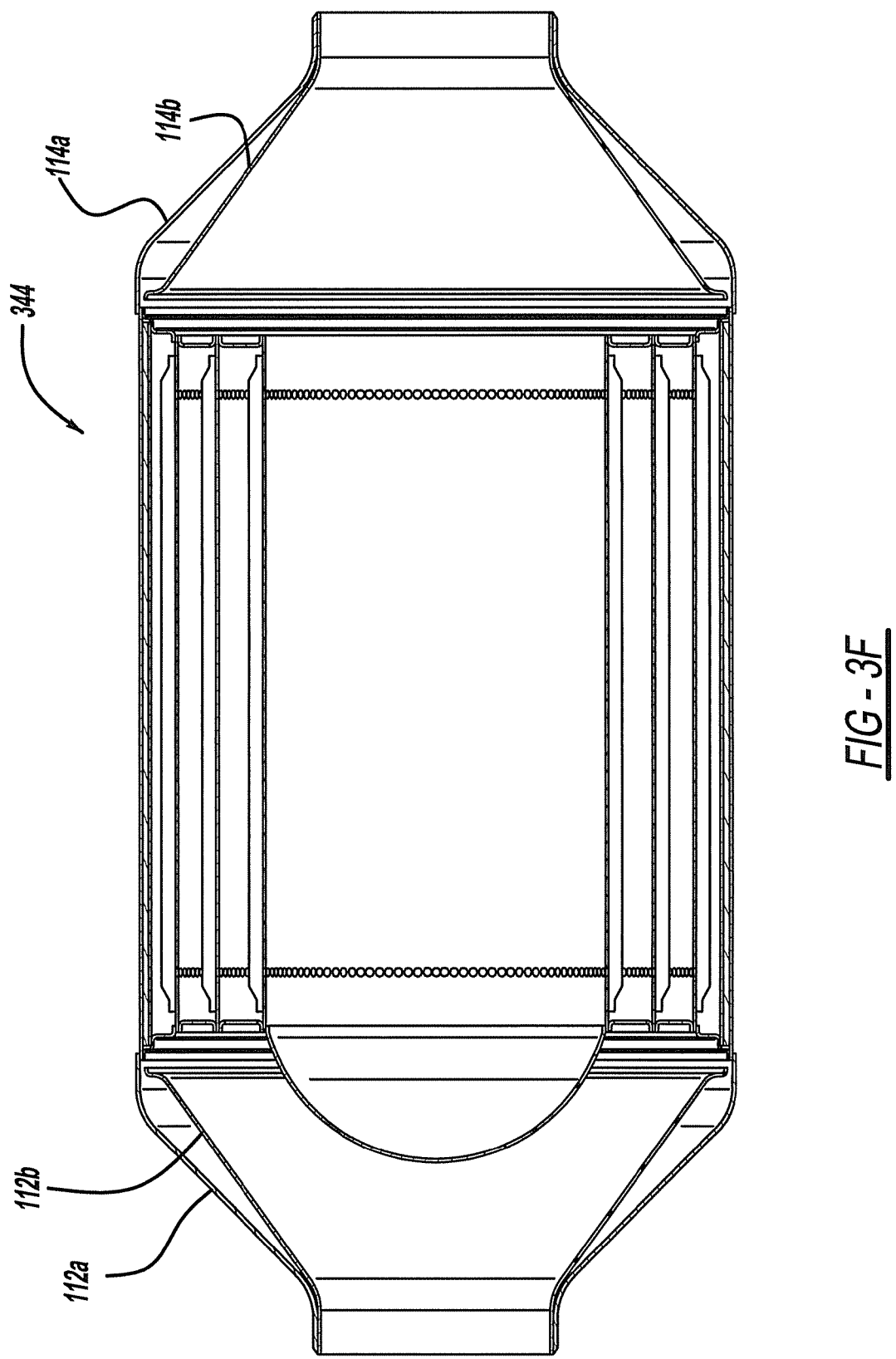
FIG. 3F shows the final step of the particulate filter assembly process of the present teachings.

With reference to FIGS. 3D, 3E and 3F, the steps for assembling a multi-cartridge particulate filter as shown in FIG. 1 is set forth. For the sake of example, and without limitation, the assembly method of FIGS. 3D, 3E and 3F is for an assembly containing three nested cartridges. It will be apparent to those skilled in the art that the described method could be applicable to any number of nested cartridges.

The method begins with the assembly of the inner, middle and outer cartridges of FIG. 1 in accordance with the steps described above with reference to FIG. 3C. Next at step 330 of FIG. 3D, center cap 122 is welded to inner cartridge assembly 120. At step 332, inlet inner baffle 138 is welded to an inlet end of inner cartridge assembly 120 and outlet inner baffle 130 is welded to an outlet end of inner cartridge assembly 120.

At step 334, middle cartridge assembly 118 is slid over the inner cartridge 120 and the cartridge assembly 118 is welded to inner baffles 138 and 130. At step 336 of FIG. 3D, inlet middle baffle 136 and outlet middle baffle 128 are welded to middle cartridge assembly 118.

Proceeding to FIG. 3E, the next step in the assembly method is at 338 wherein outer cartridge assembly 116 is slid over middle cartridge assembly 118. Outer cartridge assembly 116 is then welded to inlet middle baffle 136 and outlet middle baffle 128.

At step 340, optionally a layer of heat insulative material 104 may be wrapped around retainer ring 106, and the insulation and retainer ring are then stuffed as a unit into outer shell 102.

At step 342, inlet outer baffle 134 and outlet outer baffle 126 are welded to the outer cartridge assembly 116 and outer shell 102 is welded to baffles 134 and 126. Alternatively, prior to the stuffing step at 340, one of the input or output outer baffles could be welded to the outer cartridge, the stuffing step then performed, and the other outer baffle then welded in place.

The final assembly step is shown in FIG. 3F wherein inlet end frustro-conical sections 112a, 112b are welded to an inlet end of outer shell 102 and outlet end frustro-conical sections 114a, 114b are welded to an outlet end of outer shell 102.

Figure 4:
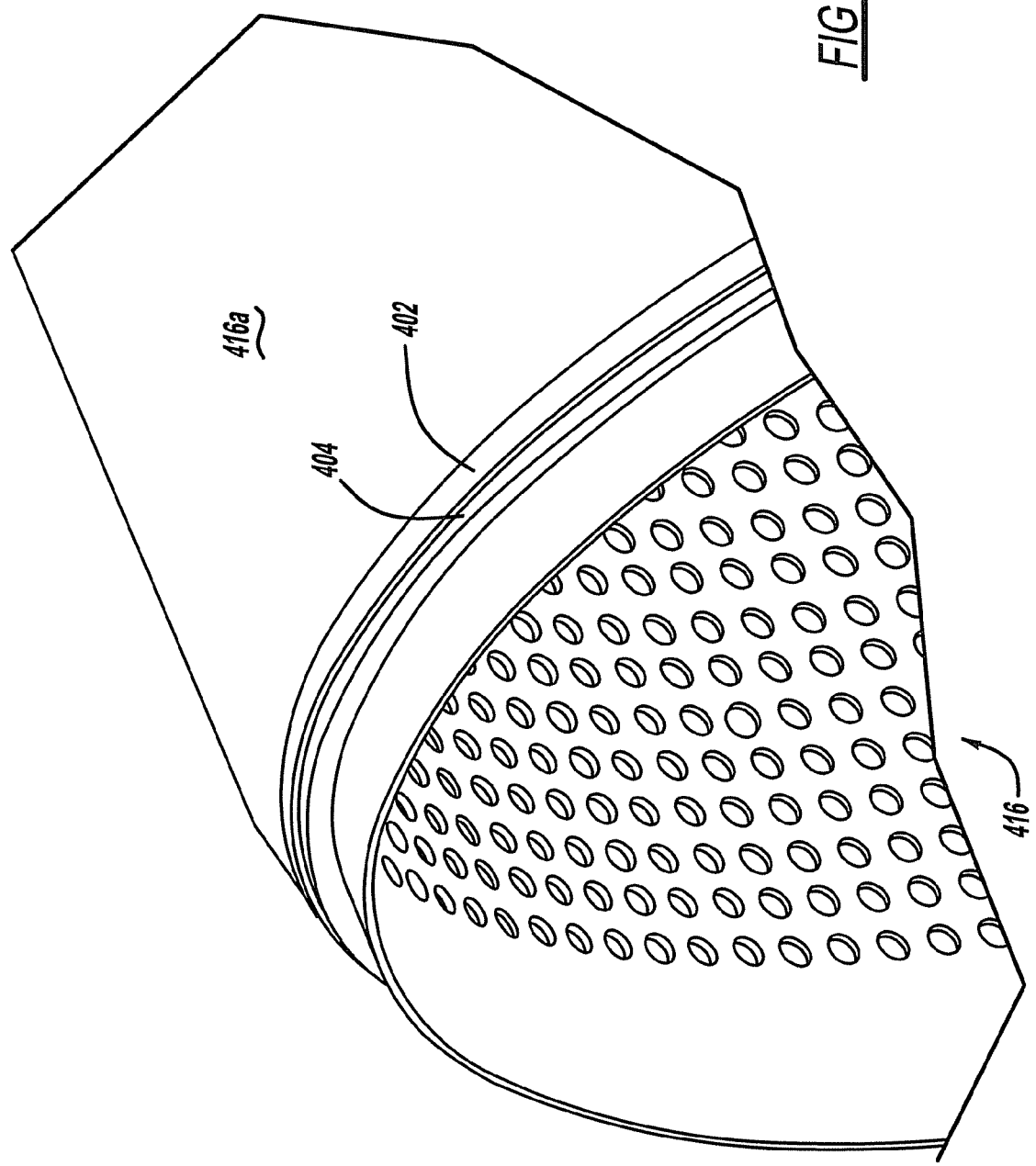
FIG. 4 is a perspective view of a cartridge assembly showing a retainer ring for the crimped end portions of the filter media.

With reference to FIG. 4, each cartridge assembly 416 may be more easily handled by automatic apparatus, such as a robot, if a retainer ring 402 is placed around crimped end portions 404 of filter media 416a prior to transferring the cartridge to a welding station for permanent attachment of the filter medium to opposite ends of its corresponding perforated support tube.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A particulate filter cartridge assembly comprising:
a perforated support tube;
a woven metal fiber filter medium surrounding the support tube and having inlet and outlet ends crimped down to the support tube, the filter medium welded to the support tube at crimped portions;
an outer housing shell surrounding the woven metal fiber filter medium;
a perforated inlet baffle radially extending from an inlet end of the support tube to an inlet end of the outer housing shell;
a solid outlet baffle radially extending from an outlet end of the support tube to an outlet end of the outer housing shell; and
a solid inlet center cap coupled to the inlet end of the support tube.

2. The assembly of claim 1 wherein the particulate filter is adapted to trap Diesel particulates.

3. The assembly of claim 1 further comprising an inlet retention ring surrounding the inlet end crimped portion of the filter medium and an output retention ring surrounding the outlet end crimped portion of the filter medium.

4. The assembly of claim 1 wherein the filter medium between the inlet crimped end and the outlet crimped end is pleated.

5. The assembly of claim 1 further comprising an inlet frustro-conical section coupled to the inlet end of the outer housing shell; and
an outlet frustro-conical section coupled to the outlet end of the outer housing shell.

6. A particulate filter assembly comprising:
a first perforated support tube having an inlet end and an outlet end;
a first woven metal fiber medium surrounding the first support tube, crimped down to the first support tube at its inlet and outlet ends and welded to the first tube at crimped ends of the first filter medium;
a second perforated support tube having an inlet end and an outlet end and surrounding the first woven metal fiber medium;
a second woven metal fiber filter medium surrounding the second support tube, crimped down to the second support tube at its inlet and outlet ends and welded to the second support tube at crimped ends of the second filter medium;
a solid inlet center cap coupled to the inlet end of the first support tube;
a first perforated inlet baffle radially extending from an inlet end of the first support tube to an inlet end of the second support tube;
a first solid outlet baffle radially extending from an outlet end of the first support tube to an outlet end of the second support tube;
an outer housing shell surrounding the second woven metal fiber medium;
a second solid input baffle radially extending from an input end of the second support tube toward an inlet end of the outer housing shell; and
a second perforated outlet baffle radially extending from an outlet end of the second support tube toward an outlet end of the outer housing shell.

7. The particulate filter assembly of claim 6 further comprising:
a third perforated support tube surrounding the second woven metal fiber medium inside the outer housing shell;
a third woven metal fiber filter medium surrounding the third support tube, crimped down to the third support tube at its inlet and outlet ends and welded to the third support tube at crimped ends of the third filter medium;
a third perforated input baffle radially extending between the inlet end of the third support tube and the inlet end of the outer housing shell; and
a third solid output baffle radially extending between the outlet end of the third support tube and an outlet end of the outer housing shell.

8. The particulate filter assembly of claim 7 further comprising:
a frustro-conical inlet section coupled to the inlet end of the outer housing shell; and
a frustro-conical outlet section coupled to the outlet end of the outer housing shell.

9. The particulate filter assembly of claim 8 further comprising:
a layer of heat insulating material adjacent an inner surface of the outer housing shell.

10. The particulate filter assembly of claim 9 wherein the first, second and third filter media are pleated.

* * * * *